United States Patent [19]

Benson et al.

[11] Patent Number: 5,030,968

[45] Date of Patent: Jul. 9, 1991

[54] RECORDER ENCLOSURE WITH PRINTHEAD AND ROLLER ATTACHED TO PIVOTABLE COVERS

[76] Inventors: James A. Benson, 2612 W. Lake Sammamish Blvd. SE., Bellevue, Wash. 98008; Gregory S. Baletsa, 30 Douglas Rd., Dracut, Mass. 01826; E. Hubbard Yonkers, 13 Cooney St., Somerville, Mass. 02143

[21] Appl. No.: 292,497

[22] Filed: Dec. 30, 1988

[51] Int. Cl.[5] .............................................. G01D 15/10

[52] U.S. Cl. ............................... 346/76 PH; 346/145; 346/33 ME

[58] Field of Search ............. 346/76 PH, 145, 33 ME; 128/419 D, 419 R, 710; 364/464.02

[56] References Cited

U.S. PATENT DOCUMENTS 4,530,066 7/1985 Ohwaki et al. ..................... 364/708
4,734,874 3/1988 Hwang et al. ...................... 364/708
4,788,658 11/1988 Hanebuth .......................... 364/708

*Primary Examiner*—Benjamin R. Fuller
*Assistant Examiner*—Huan Tran

[57] ABSTRACT

An enclosure (10) for a device (86) for recording information onto a strip of printing medium (14) is disclosed, and includes a base (11), forming a cavity (84), and first and second covers (12, 13) pivotally secured to the base. The first and second covers move opposedly to each other between open and closed positions to allow replacement of the printing meduim, which is wound onto a spool. The base and a printhead (16) are pivotally coupled to the first cover by cover and printhead links (30, 58), enabling the printhead to move with and remain covered by the first cover when the enclosure is opened. A drive roller (17) is rotatably secured to the second cover and is biased against the printhead for advancement of the printing medium when the enclosure is closed. When the second cover pivots to its open position, the roller is withdrawn from the base, but remains continuously engaged to a drive motor (18) by a series of gears. The first and second cover meet when closed to form a printing medium exit slot, and are locked in their closed position by locking tabs (42) included on the first cover, locking notches (44, 45) included in the base and second cover, and the cooperative action of the cover and printhead links. Lifting of a release flange (50) included on the first cover unlocks the covers, allowing biasing springs (34, 40) to move the covers to their open positions. An ejector arm (52) attached to the second cover ejects the depleted printing medium spool upon opening of the enclosure.

20 Claims, 5 Drawing Sheets

*Fig. 1.*
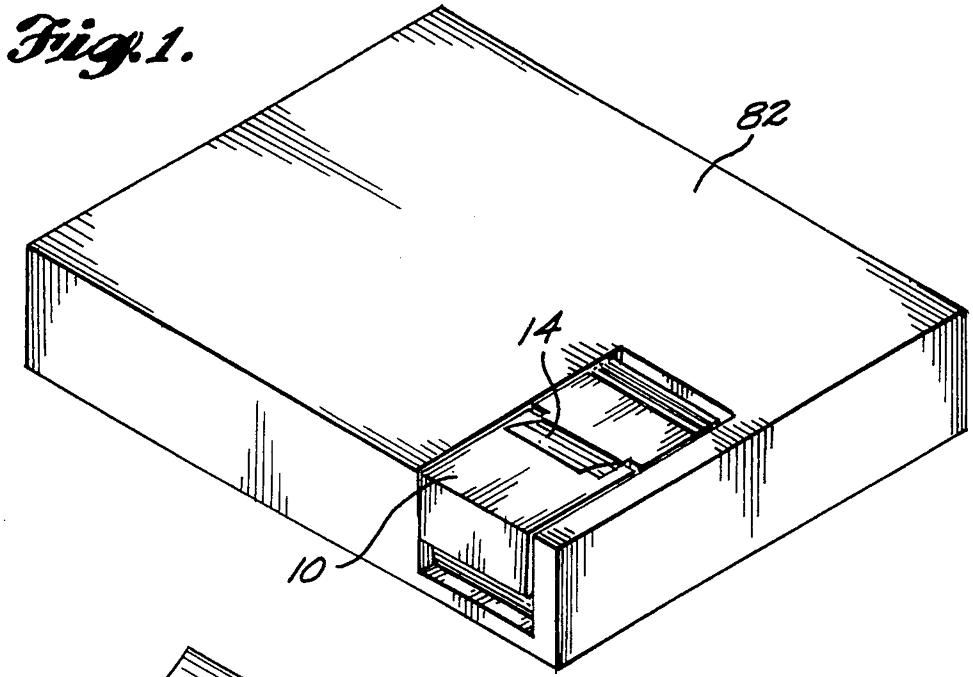
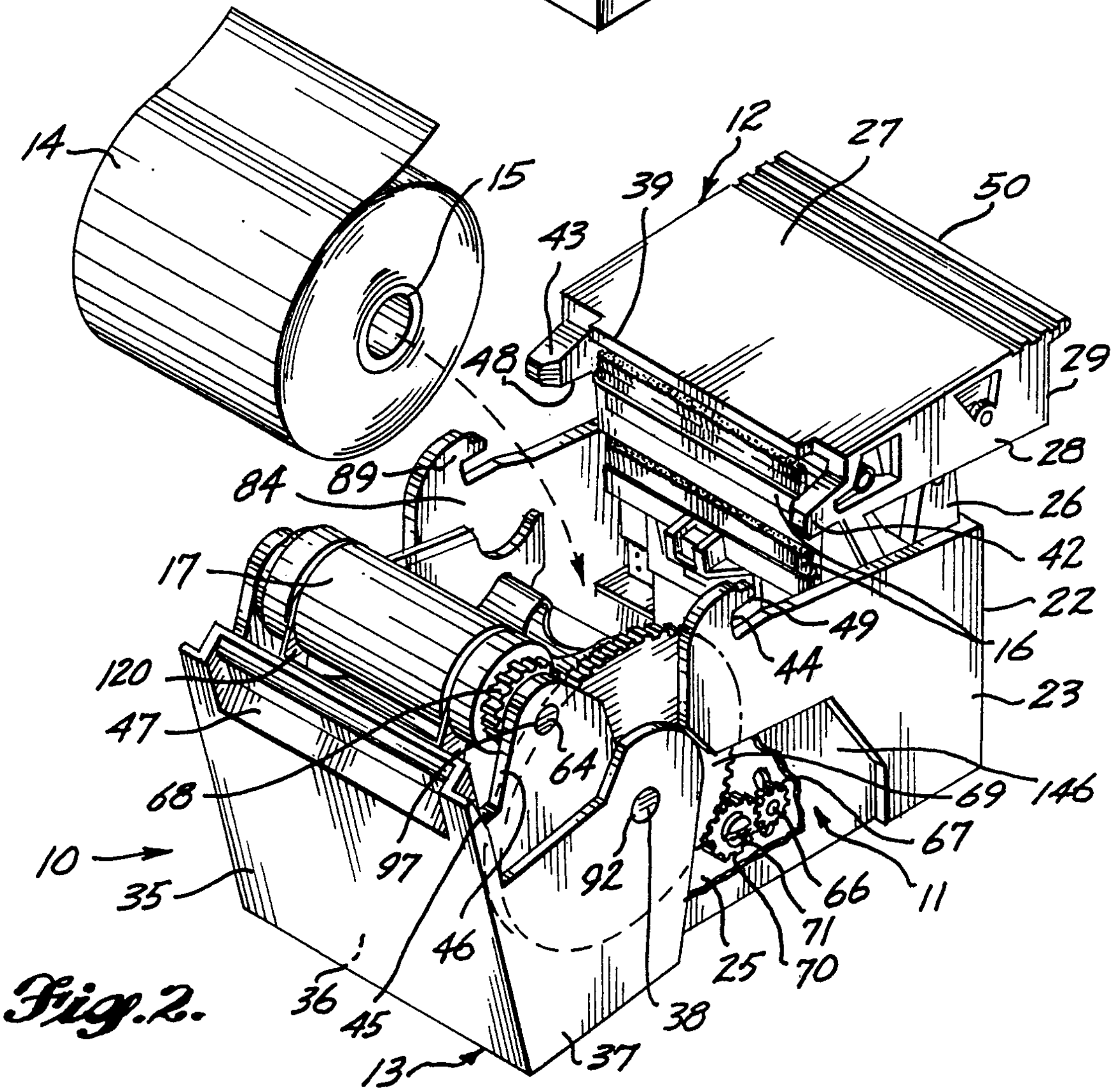
*Fig. 2.*

Fig. 7.
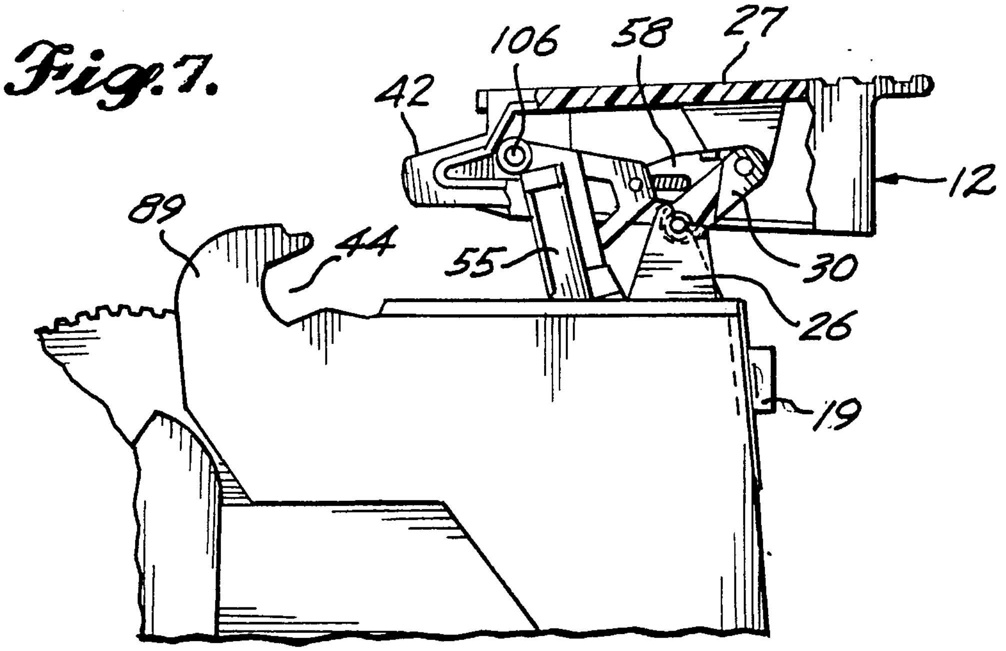
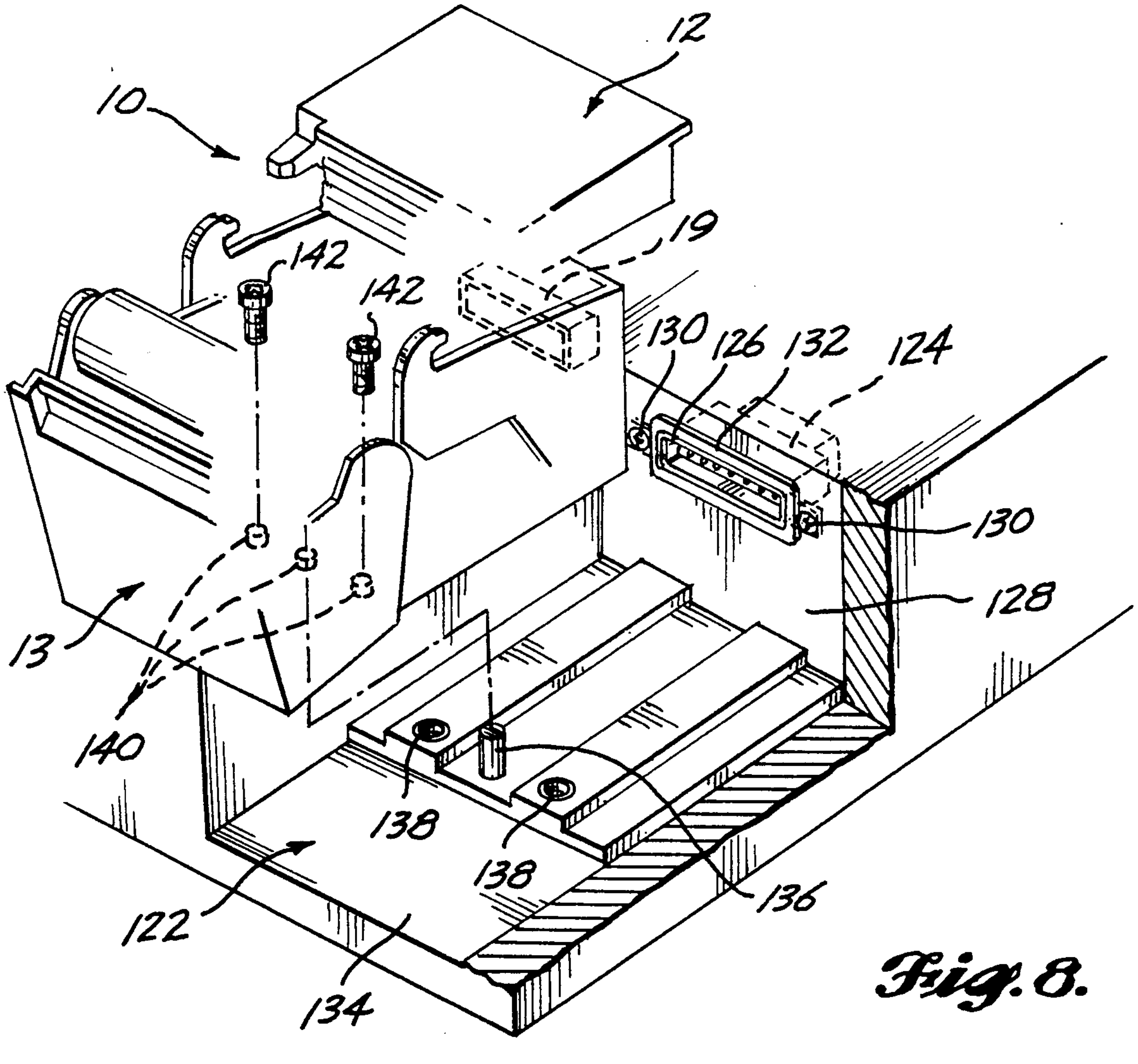
Fig. 8.

RECORDER ENCLOSURE WITH PRINTHEAD AND ROLLER ATTACHED TO PIVOTABLE COVERS

BACKGROUND OF THE INVENTION

The present invention relates to devices for the recording of information, and more particularly, to enclosures for such devices. A typical enclosure for a recording device has a base and a hinged cover. The base houses a printing medium, such as a roll of paper that is wound onto a spool supported by a spindle. A printing device, such as a thermal printhead, is included to record information onto the printing medium. The paper strip is advanced by a roller that is biased against the thermal printhead and that is driven by a motor.

When a replacement roll of paper is placed into a conventional enclosure, the hinged cover is manually swung open to expose the recording device. The existing roll of paper is then manually removed from the base and the spindle pulled from the center of the spool. Next, a replacement roll of paper is inserted over the spindle and placed into the enclosure. The free end of the paper on the roll is then threaded between the thermal printhead and roller by rotating the roller and, finally, the cover is closed.

Conventional enclosures for recording devices perform adequately in many situations. As will be appreciated, however, the replacement of paper in a conventional recording device enclosure is a time-consuming, multistep process. For many applications, such as the enclosure of recording devices used in emergency medical care equipment, this process may be unacceptably slow.

One proposed solution to the problem of multistep paper replacement is offered by U.S. Pat. No. 4,641,980 (Matsumoto), which discloses an enclosure having a thermal printhead attached to a hinged cover. Although the hinged cover may be selectively locked in a closed position, it is spring-biased toward an open position and can be opened by the depression of a locking release mechanism. When a roll of paper is placed in the enclosure, the free end of the paper on the roll is positioned to overlie the printer. By closing the hinged cover, the paper is then captured between the roller and printhead, eliminating the need for threading.

One drawback of the Matsumoto recording device enclosure is its exposure of the thermal printhead, which is typically fragile, to impact with foreign objects during replacement of the paper roll. This exposure results from the printhead's attachment adjacent the projecting end of the hinged cover. The Matsumoto design also requires a substantial amount of free space around the enclosure to accommodate the arcuate movement of the hinged cover as it is swung between the closed and open positions. As a result, the enclosure may be inadequate for recording devices used in close proximity to other equipment. In addition, unintentional opening of the enclosure and interruption of the operation of the recording device can occur if the Matsumoto locking release mechanism is inadvertently depressed.

Although other enclosures for recording devices have been designed to accommodate separation of the roller and thermal printhead during replacement of the paper roll, they also suffer disadvantages. For example, in one arrangement, a drive chain linkage connects the roller to the motor, and this linkage must be disconnected to permit paper replacement. The linkage must then be reconnected and aligned before operation of the recording device can recommence.

SUMMARY OF THE INVENTION

The present invention is directed to an enclosure for a device for recording information onto a printing medium. The enclosure includes a base and first and second covers pivotably secured to the base. The base forms a cavity for receiving the printing medium and recording device components, which include a roller, a printhead, and a motor. The first cover moves in opposition to the second cover as both covers are moved between open and closed positions. The covers substantially cover the cavity of the base in their closed positions and, in their open positions, allow replacement of the printing medium. The first cover is pivotably coupled to the base by a cover link.

The first and second covers are spring biased toward their open positions, but may be selectively locked in their closed positions. Locking is accomplished, in part, through locking tabs located on the first cover that are inserted into corresponding locking notches located on the second cover and the base. More particularly, when the first cover is closed, the cover link is rotated to an over-center position that maintains the first cover in its closed position. The cooperative action of the locking tabs and locking notches then holds the second cover in the closed position. The covers are unlocked by lifting upward on a release flange located on the first cover, bringing the cover link back past its center position and allowing the biasing springs to open both the first and second covers.

The cavity of the base receives a roll of printing medium, with the roll resting on the bottom of the cavity without requiring a spindle to hold the roll. A curved printing medium ejection arm is secured to the second cover, extending into the base when the second cover is in its closed position. The ejection arm rotates upward to eject the depleted printing medium roll when the second cover is moved to the open position.

A printhead, paper advancement roller, and motor are also attached to the enclosure. The printhead is attached to the first cover and the roller is attached to the second cover. Thus, when the covers are opened, the printing medium roll can be replaced without threading the printing medium between the roller and printhead. A roller gear is affixed to the roller and coupled by a plurality of intermediate gears to a motor gear that is rotatably secured to the motor, allowing continuous engagement of the roller to the motor regardless of the position of the second cover.

The printhead is pivotally attached to the first cover, in part, by a printhead link. The printhead link has a first end pivotally attached to the first cover and a second end pivotally attached to the printhead. The printhead is also pivotally attached directly to the base.

By using two covers, less free space is required around the enclosure than is required by conventional enclosures employing a single hinged cover. The pivotal attachment of both the printhead and roller to the first and second covers also provides free access to the base cavity for replacement of the printing medium, eliminating the need to thread the printing medium between the roller and the printhead. In addition, the design allows the printhead to remain recessed in the enclosure even when the covers are opened, thus, protecting the printhead from damage by foreign objects.

BRIEF DESCRIPTION OF THE DRAWINGS

This invention will presently be described in greater detail, by way of example, with reference to the accompanying drawings in which:

FIG. 1 is an isometric view of a recording device enclosure having two covers and being housed within a portable cardiac care system;

FIG. 2 is an isometric view of the enclosure of FIG. 1;

FIG. 7 is a partial side elevation view of the enclosure in cross section; and

FIG. 8 is an isometric view illustrating features relating to the mounting of the enclosure within the cardiac care system.

DETAILED DESCRIPTION OF THE PREFERRED EMBODIMENT

FIG. 1 illustrates a recorder enclosure 10, constructed in accordance with the present invention, housed within an information-producing system 82. Information-producing system 82 may be any one of many presently available testing, monitoring, or calculating systems. However, recorder enclosure 10 is particularly well suited for inclusion in a portable cardiac care system 82, intended for use in the field to monitor and treat potentially harmful heart conditions.

Figure 3:
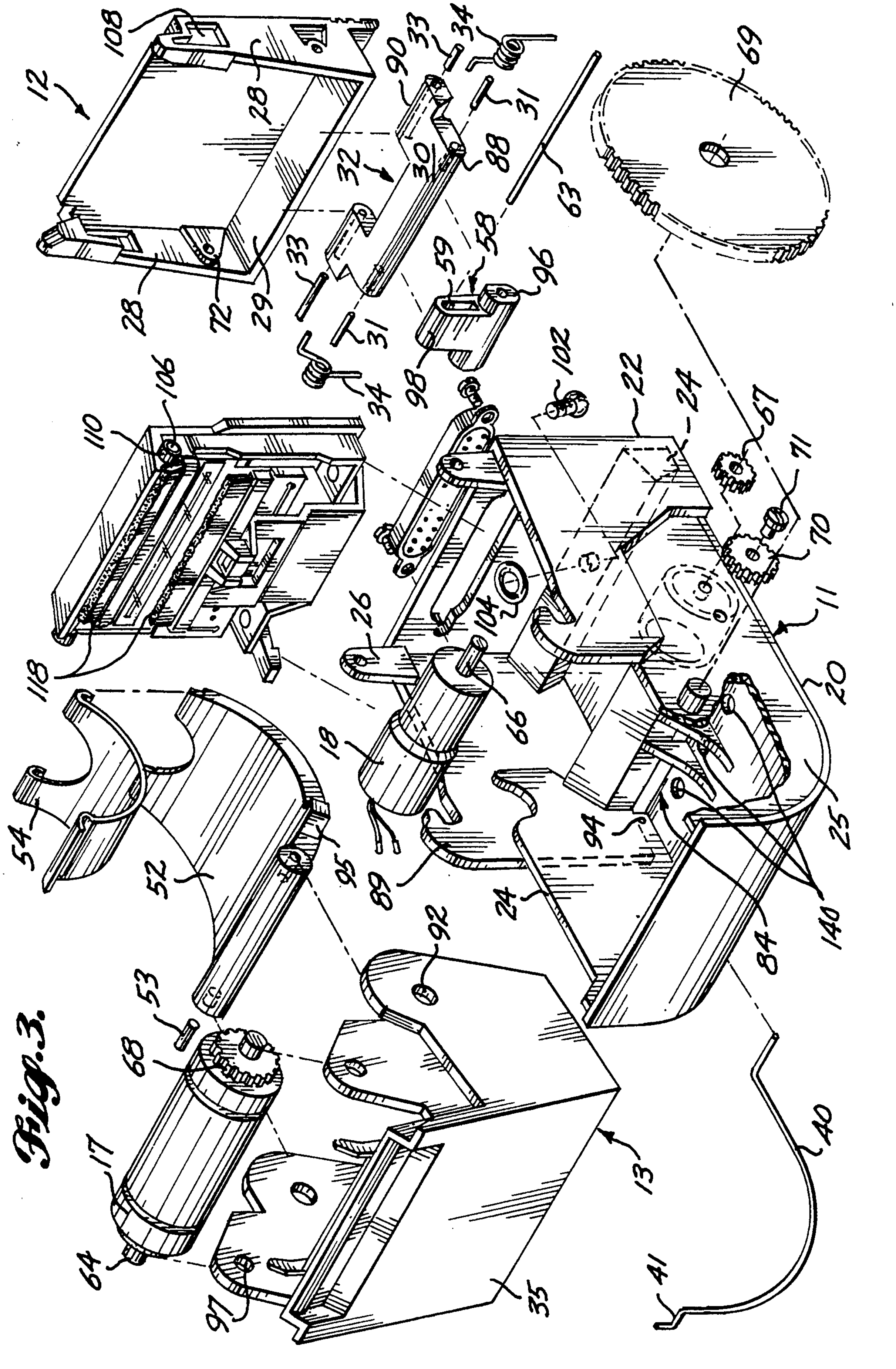
FIG. 3 is an isometric exploded view of the enclosure.

FIGS. 2 and 3 illustrate recorder enclosure 10 in detail. Enclosure 10 includes a base 11 and first and second covers 12 and 13 that are pivotably connected to base 11 for movement between open and closed positions. The enclosure 10 also houses the components of a recording device. These components include a thermal printhead 16, which is coupled to first cover 12 and records information onto paper 14 by raising its temperature. A roller 17 is attached to second cover 13 for advancing the paper 14 between roller 17 and the thermal printhead 16 in response to the operation of a motor 18. FIG. 2 shows the first cover 12 and second cover 13 in their open positions, permitting the insertion of a printing medium, such as a roll of paper 14 wound onto a spool 15, into a cavity 84 formed by the base 11. Paper 14 is preferably a thermally sensitive paper, although other types of paper could be utilized. Upon moving covers 12 and 13 to their closed positions (FIG. 4), the paper 14 is "automatically" captured between roller 17 and printhead 16, without requiring threading.

Addressing these various elements of enclosure 10 in greater detail, reference is had to FIG. 3. As shown, the roughly box-like base 11 includes a bottom 20, a curved end wall 21, a connector end wall 22, a motor sidewall 23, and a biasing sidewall 24. Sidewalls 23 and 24 each include an inwardly recessed portion 25 adjoining end wall 21. Sidewalls 23 and 24 also include base pivot flanges 26, projecting upward adjacent the intersection of sidewalls 23 and 24 with connector end wall 22.

Referring to FIG. 2, the first cover 12 includes a rectangular top 27, two relatively short sidewalls 28, and a relatively short end wall 29. A cover pivot flange 72 is provided on the inside of each sidewall 28. The cover pivot flanges 72 allow cover 12 to be attached to base 11 in the following manner.

Figure 4:
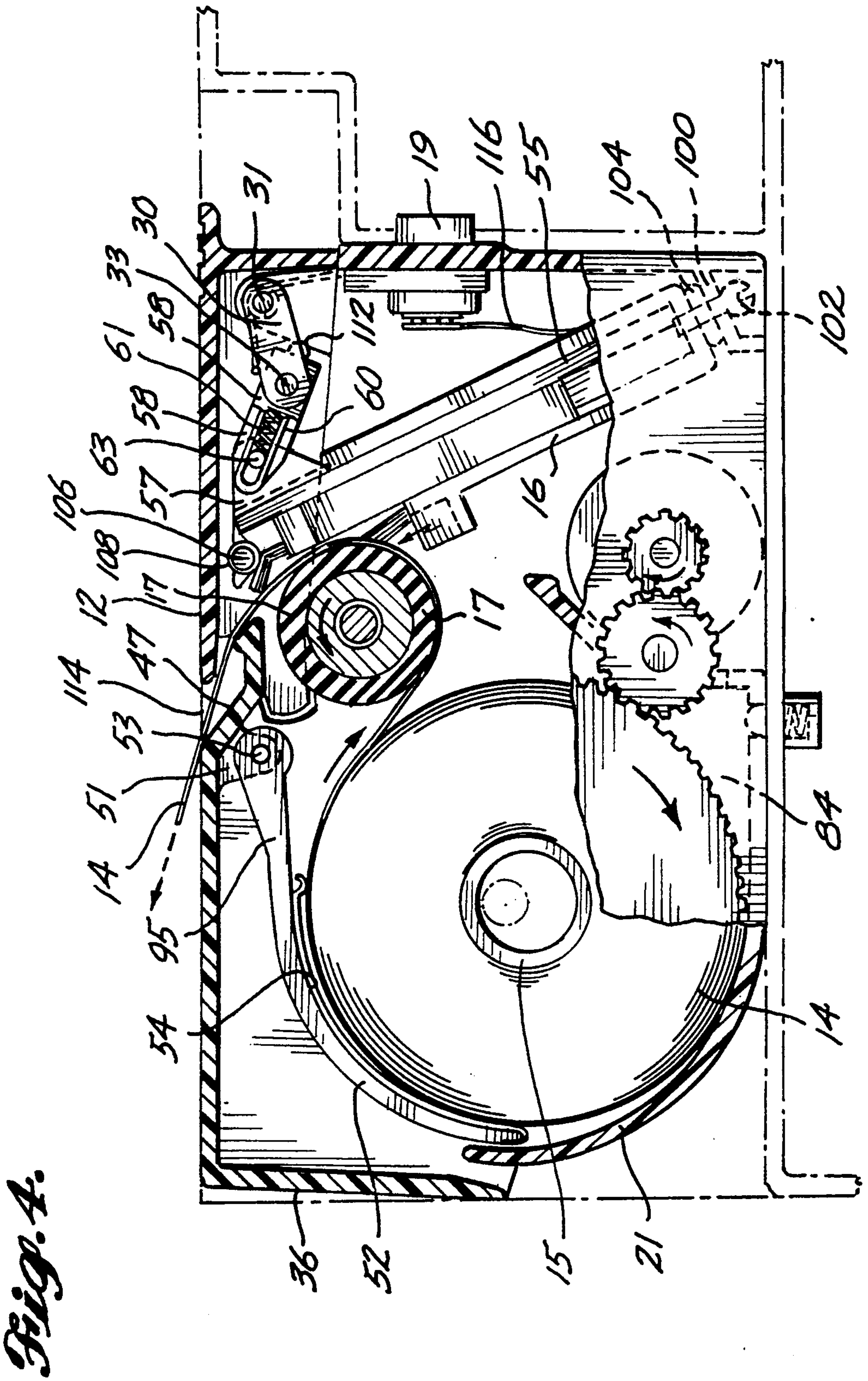
FIG. 4 is a side elevation view of the enclosure in cross section.
Figure 5:
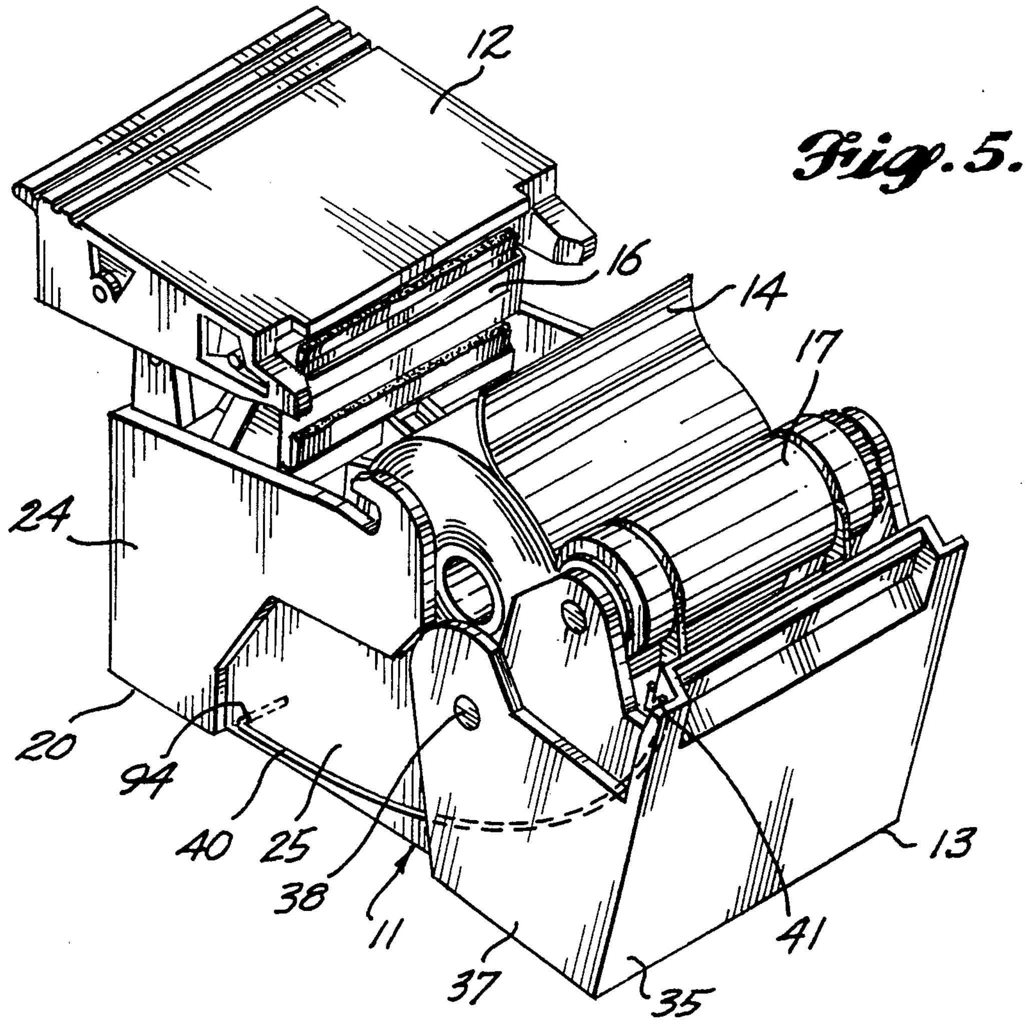
FIG. 5 is an isometric view of the enclosure.

As shown in FIG. 4, the coupling of first cover 12 to base 11 is accomplished, in part, by a flat, roughly U-shaped cover link 30. The length of cover link 30 is slightly less than the distance separating the sidewalls 23 and 24 of base 11 (FIG. 3). Cover link 30 has a first edge 88 and is pivotally secured to the base pivot flanges 26 by pins 31 passing through link 30 adjacent edge 88. Cover link 30 also has a second edge 90, which includes a notch 32 that is centered along edge 90. The first cover 12 is pivotally secured to cover link 30 by pins 33 that pass through the cover link 30 adjacent edge 90 and extend into the cover pivot flanges 72. Torsion springs 34 are located on pins 31, between the cover link 30 and the pivot flanges 26 projecting from base sidewalls 23 and 24, to bias link 30 and, hence, first cover 12 to its open position.

Although discussed in greater detail below, several additional elements couple first cover 12 to base 11. As best shown in FIGS. 3 and 4, these elements include a printhead mounting assembly 55 and a printhead link 58. The printhead mounting assembly 55 supports the thermal printhead 16 and is positioned within the cavity 84 formed by base 11. The bottom of assembly 55 is pivotably secured to a support arm 100, provided adjacent the intersection of the bottom 20 and connector end wall 22 of base 11, by a screw 102. The screw 102 threadably engages the printhead mounting assembly 55 and has a substantially spherical head that is received by support arm 100 to provide a pivotable connection between the printhead mounting assembly 55 and base 11. An O-ring 104 surrounds the shaft of screw 102 and provides a cushion between the bottom of printhead assembly 55 and support arm 100.

The top of printhead mounting assembly 55 includes a pair of outwardly directed arms 106 for cooperative engagement with slots 108 formed in the sidewalls 28 of the first cover 12. The arms 106 restrict the pivotal motion of first cover 12 when in the open position to further protect the thermal printhead 16 in a manner described below. To limit wear or abrasion between the arms 106 of assembly 55 and the slots 108 in cover 12, a cushioning ring 110 is preferably included around each arm 106.

The printhead link 58 pivotably couples the printhead mounting assembly 55 to the first cover 12 and cover link 30. As shown in FIG. 3, the printhead link 58 is roughly T-shaped and has a wide portion 96 designed to be received by the notch 32 formed by cover link 30. Link 58 is pivotably secured to the first cover pivot flanges 72 and cover link 30 by pins 33 extending into the wide portion 96 of link 58.

The printhead link 58 also includes an elongate slot 59 provided in a narrow portion 98 of link 58. A pin 63 extends through slot 59 and into a pair of flanges 57 positioned on the printhead mounting assembly 55, pivotably securing assembly 55 and printhead link 58. A cylindrical spring-retaining cavity 60 (FIG. 4) is also provided in printhead link 58, passing from slot 59 through the wide portion 96 of link 58 in a direction transverse to pin 63. A coil spring 61 is positioned within cavity 60 and retained in place by a screw 112 positioned in the cavity 60 adjacent the wide portion 96 of link 58. As will be discussed in greater detail, spring 61 presses against pin 63 and the force it applies to pin 63 varies as the first cover 12 is opened and closed.

Addressing now the structure of the second cover 13, second cover 13 includes a top 35, rear wall 36, and sidewalls 37 (FIG. 2). The second cover 13 is pivotably secured to base 11 by two pivot bosses 38 provided on base 11. Pivot bosses 38 project outwardly from the center of the recessed portions 25 of the base sidewalls 23 and 24 and pass through holes 92 included in second cover sidewalls 37. The second cover 13 is biased toward an open position (FIG. 2) by a curved wire spring 40 located in the recessed portion 25 of base sidewall 24 adjacent the inside surface of the second cover sidewall 37. A first end of spring 40 is pivotally secured within an opening 41 in the sidewall 37 of the second cover 13 adjacent the top 35 of cover 13. Spring 40 then curves under base pivot boss 38 and has a second end 40 that is inserted into an opening 94 in the recessed portion 25 of base sidewall 37, near the bottom 20 of base 11.

When in their open positions (FIG. 2), first cover 12 and second cover 13 permit a roll of paper 14 to be dropped into the cavity 84 formed by base 11. When covers 12 and 13 are then closed (FIG. 6), the paper 14 is captured between printhead 16 and drive roller 17. The top 27 of the first cover 12 and top 35 of the second cover 13 also converge approximately midway between the end walls 21 and 22 of base 11, covering the cavity 84 formed by base 11. A slot 114 formed between the two covers 12 and 13 allows the paper 14 to exit the enclosure 10. The top 27 of first cover 12 includes a knife edge 39 adjacent slot 114 that allows a printed portion of the paper 14 to be torn from the rest of the roll.

Addressing now the manner in which the first and second covers 12 and 13 are maintained in their closed position, reference is again had to FIG. 2. As shown, each sidewall 28 of the first cover 12 includes a locking tab 42 that projects beyond the top 27 of cover 12, toward the center of enclosure 10. The locking tabs 42 are slightly tapered when viewed in side elevation and project downwardly at an angle of approximately 15 degrees from the top 27 of first cover 12.

The sidewalls 23 and 24 of base 11 each include a locking arm 89 that curves upwardly midway between the end walls 21 and 22 of base 11 and then extends toward end 22 to define a base-locking notch 44. The base-locking notches 44 open toward first cover 12 and are also aligned at an angle of approximately 15 degrees with respect to the top 27 of first cover 12. The base-locking notches 44 are shaped to conform to, but are slightly larger than, locking tabs 42 and include a top wall 49. The function of the locking notches 44 is to receive the locking tabs 42 of the first cover 12 when first cover 12 is in the closed position.

Each sidewall 37 of the second cover 13 also includes a cover-locking notch 45 located adjacent the intersection of the sidewalls 37 and the beveled edge 47 of second cover 13. Cover-locking notches 45 are the same shape as the base-locking notches 44 and align with notches 44 when the second cover 13 is in its closed position. Each cover-locking notch 45 also has a top wall 46. The cover-locking notches 45 cooperate with the base-locking notches 44 to receive the locking tabs 42 on the first cover 12. More particularly, the thickness of each locking tab 42, measured in a direction parallel to the knife edge 39 on first cover 12, is approximately equal to the combined thickness of the aligned base-locking notch 44 and cover-locking notch 45. When first cover 12 and second cover 13 are in their closed positions (FIG. 6), the locking tabs 42 simultaneously engage the base-locking notches 44 and cover-locking notches 45, restricting relative movement between the first cover 12, second cover 13, and base 11.

Having reviewed the various components of enclosure 10 that cooperate to secure covers 12 and 13 in their closed positions, the manner in which these components interact will now be described in greater detail. Beginning with both covers 12 and 13 in their open positions, as shown in FIG. 2, the top 27 of first cover 12 is roughly parallel to the bottom 20 of base 11, while the top 35 of second cover 13 is roughly perpendicular to the bottom 20 of base 11. First cover 12 is maintained in this position by the biasing action of springs 34, transmitted through cover link 30, and by the restrictive action of the arms 106 provided on the printhead mounting assembly 55. The second cover 13 is similarly maintained in its open position by the biasing action of the curved spring 40.

To close and lock covers 12 and 13, the second cover 13 is first rotated about the pivot bosses 38 on base 11 until the second cover-locking notches 45 align with the base-locking notches 44. In this closed position, the top 35 of cover 13 is parallel to the bottom 20 of base 11 and further rotation of cover 13 is limited by the contact of top 35 with the locking arms 89 provided on the base 11. Because spring 40 applies a force to cover 13 that tends to rotate cover 13 back to its open position, cover 13 must now be manually held in the closed position until the first cover 12 is closed.

The first cover 12 is then closed by applying a force to cover 12 that is largely directed toward the locking notches 44 and 45. As shown in FIG. 7, with the first cover 12 open, cover link 30 is directed upwardly from pins 31 and away from the center of enclosure 10. The printhead link 58 is roughly parallel to the bottom 20 of base 11. As the first cover 12 is closed, however, the cover link 30 rotates about pins 31 in a counterclockwise direction in the view of FIG. 7. Link 30 passes through vertical and horizontal positions, to a "center" position at which cover link 30 and printhead link 58 are substantially aligned.

At the center position, the locking tabs 42 of the first cover 12 are received within the locking notches 44 and 45 of base 11 and second cover 13, respectively. In addition, the printhead 16 has already contacted roller 17, causing the pin 63 that couples printhead mounting assembly 55 to printhead link 58 to move in slot 59. In fact, the spring 61 housed by the printhead link 58 is most fully compressed by pin 63 in the center position.

By now pushing cover 12 down against base 11, the cover link 30 is rotated past the center position to the "over-center" position shown in FIG. 4. As shown, the cover link 30 and printhead link 58 are no longer in alignment when placed in the over-center position. More particularly, cover link 30 is angled downward from pins 31, toward the center of enclosure 10. The printhead link 58 defines roughly the same angle with, for example, the top 27 of first cover 12 as link 30, but extends in the opposite direction. Because links 30 and 58 are no longer aligned, some of the pressure has now been relieved from the spring 61 within link 58. Thus, the first cover 12 is maintained in its closed position independent of the application of external force. First cover 12 then holds second cover 13 closed via the cooperative engagement of locking tabs 42 and locking notches 44 and 45.

To open the covers 12 and 13, the links 30 and 58 must first be rotated to their aligned center position, again compressing the printhead link spring 61. The force of the first cover-biasing springs 34 is, however, unable to sufficiently compress spring 61 by itself. As a result, when the first cover 12 is closed, cover 12 will remain closed and the locking tabs 42 cooperate with the locking notches 44 and 45 of base 11 and second cover 13, respectively, to keep cover 13 closed also.

Figure 6:
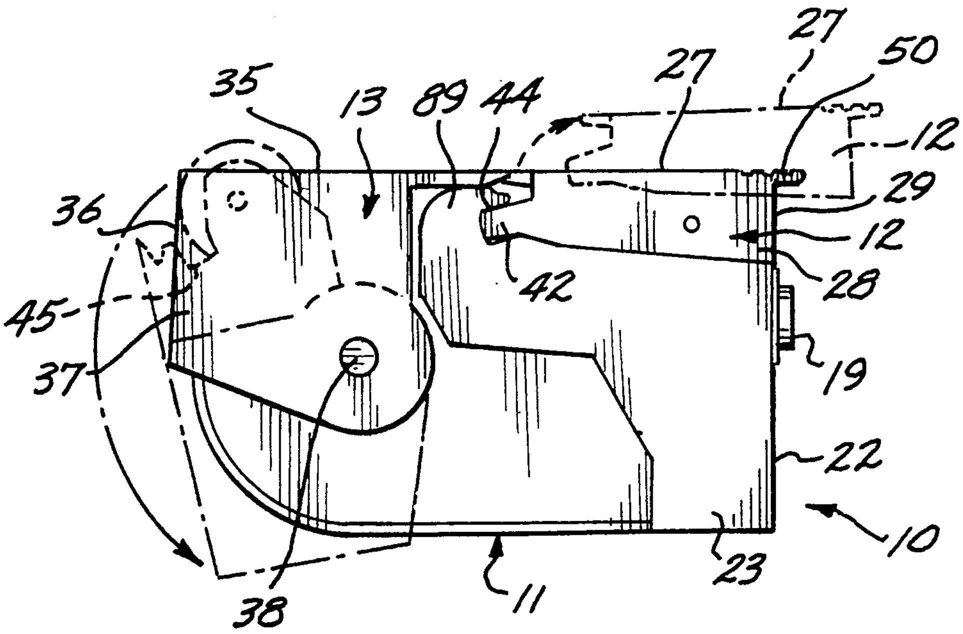
FIG. 6 is a side elevation view of the enclosure illustrating the operation of its covers between open and closed positions.

To open covers 12 and 13 the operator must manually overcome the "over-center" mechanism formed by links 30 and 58 and springs 34 and 61. In that regard, as shown in FIG. 6, first cover 12 further includes a release flange 50 projecting outwardly from the intersection of the cover top 27 and cover end wall 29. The release flange 50 allows enclosure 10 to be selectively unlocked in the following manner. When a lifting force is applied to the underside of release flange 50, the link spring 61 is compressed, allowing links 30 and 58 to move to, and past, their center position. The first cover-biasing springs 34 then take over and pivot first cover 12 upward, withdrawing the locking tabs 42 from the locking notches 44 and 45. At that point, springs 34 and 40 restore covers 12 and 13, respectively, to their open positions.

Reviewing now a number of additional features of enclosure 10, the first feature to be discussed relates to a paper ejection mechanism. As shown in FIGS. 3 and 4, the second cover 13 includes ejector flanges 51 on the underside of the top 35 of cover 13 near the cover's beveled edge 47. A curved ejector arm 52 is pivotally secured to flanges 51 by a pin 53. When the second cover 13 is in its closed position, ejector arm 52 extends downward into the cavity 84 formed by base 11, extending along a portion of the roll of paper 14. A curved spring clip 54 is fixed to the ejector arm 52 near the projecting end of arm 52, with the radius of curvature of spring clip 54 being less than the radius of curvature of ejector arm 52.

When a roll of paper 14 is located within enclosure 10 and covers 12 and 13 are closed, spring clip 54 is compressed against the roll of paper 14. This slightly restricts rotation of the paper roll 14 to prevent it from unwinding accidentally. When second cover 13 is moved to its open position, flanges 95 on each side of ejector arm 52 contact the upper surface of the sidewalls 23 and 24 of base 11, causing ejector arm 52 to pivot upwardly about pin 53. As a result, the roll of paper 14, or empty spool 15, is borne upwardly by ejector arm 52 for easy removal from cavity 84 of base 11.

Addressing now a number of the components housed by enclosure 10, an electrical connector 19 is mounted centrally on, and protruding out of, the connector end wall 22 of base 11 (FIG. 4). Connector 19 provides an electrical interface for receiving information to be recorded by printhead 16, such as heart rate data from cardiac care system 82, and power to drive motor 18. Although various styles of connector 19 or other electrical interfaces can be utilized, in the preferred arrangement, connector 19 is of the blind mounting, rack-and-panel type illustrated. As discussed in greater detail below, connector 19 helps align enclosure 10 with system 82 upon insertion of enclosure 10 into system 82.

As noted previously, enclosure 10 also includes a thermal printhead 16 for recording information onto the printing medium 14 when enclosure 10 is closed. As will be appreciated, alternative printheads, such as ink jet or dot matrix printheads, may be used in place of thermal printhead 16. FIG. 4 illustrates the attachment of thermal printhead 16 to the printhead mounting assembly 55. A flexible printed circuit 116 electrically connects connector 19 to the various electric components housed by enclosure 10, including thermal printhead 16. Static brushes 118 are included adjacent printhead 16 to limit the effect of static electricity upon the printhead 16. The two-cover design and linkage further allow printhead 16 to remain in a relatively protected, central position, even when open. As a result, the possibility of mechanical damage occurring to printhead 16 is reduced.

As noted previously, the enclosure 10 also supports an elastomer-coated roller 17 for advancing the strip of paper 14 between thermal printhead 16 and roller 17 (FIG. 2). In that regard, the sidewalls 37 of the second cover 13 each include holes 97 positioned slightly below the knife-edge 47. Roller 17 includes a shaft 64 that projects from each end of roller 17, for insertion into the holes 97 to pivotally secure roller 17 to second cover 13. A paper stripper 120 includes two spaced-apart surfaces that extend between the surface of roller 17 and the knife-edge 47 on cover 13. The paper stripper 120, thus, separates the paper from roller 17 and directs it upwardly through the slot 114 formed between covers 12 and 13 in their closed positions.

As noted previously, when first and second covers 12 and 13 are in their closed positions (FIG. 4), the printhead 16 is located parallel to and presses the paper 14 against roller 17. This is accomplished by the biasing action of the spring 61 within printhead link 58, which spring is partially compressed. With the paper 14 pressed between printhead 16 and roller 17, the paper 14 can be advanced past printhead 16 and out of the enclosure 10 by rotating roller 17.

Discussing the manner in which roller 17 is rotated, reference is had to FIG. 3. As noted previously, the enclosure 10 houses a motor 18 that drives roller 17. The motor 18 is affixed to the sidewall 23 of base 11, roughly midway between end walls 21 and 22. A rotatable drive shaft 66 extends outwardly from motor 18 and passes through the recessed portion 25 of the sidewall 23. A motor gear 67 is attached to the protruding end of drive shaft 66.

A roller gear 68 is similarly attached to the shaft 64 of roller 17 and is located inside the sidewall 37 of cover 13 that covers the recessed portion 25 of the base sidewall 23. A first intermediate gear 69 is rotatably secured onto one of the pivot bosses 38 that the second cover 13 pivots about. The first intermediate gear 69 meshes with the roller gear 68 (FIG. 2). A second intermediate gear 70 is rotatably mounted by a screw 71 secured to the recessed portion 25 of the base sidewall 23 and meshes with both the first intermediate gear 69 and the motor gear 67. The coupling of motor gear 67, second intermediate gear 70, first intermediate gear 69, and roller gear 68 thus allows motor 18 to drive roller 17.

With this construction, when the second cover 13 is pivoted on pivot boss 38 between its open and closed positions, roller 17 and roller gear 68 revolve around pivot boss 38. The sum of the radii of roller gear 68 and first intermediate gear 69 is equal to the separation of the shaft 64 of roller 17 and the pivot boss 38. Thus, the roller gear 68 remains continuously intermeshed with first intermediate gear 69 as roller 17 and roller gear 68 rotate along the periphery of first intermediate gear 69 during movement of second cover 13.

Another feature of interest with respect to enclosure 10 relates to the manner in which it is mounted in system 82. As shown best in FIGS. 3 and 8, system 82 includes a recess 122 that is slightly larger than the enclosure 10. A rack-and-panel connector 124 is mounted in an opening 126 provided in a rear wall 128 of recess 122 for cooperative engagement with the mating enclosure connector 19. In the preferred arrangement, connector 124 is attached to wall 128 by screws 130 that limit motion of connector 124 in a direction perpendicular to the plane of wall 128 but that allow some movement in the plane of wall 128. Connector 124 is further supported in opening 126 by a rubber gasket 132. The arrangement of screws 130 and gasket 132 thus allows connector 124 to undergo slight positional adjustment as the enclosure 10 is connected to system 82.

The lower wall 134 of recess 122 includes an alignment post 136 and a pair of threaded inserts 138 that also aid in connecting enclosure 10 to system 82. As shown in FIG. 3, the bottom 20 of the base 11 of enclosure 10 includes three mounting holes 140. The center hole is designed to receive the alignment post 136 provided in the lower wall 134 of recess 122. The other two holes 140 then allow enclosure 10 to be secured to system 82 by screws 142 threadably engaged with the inserts 138.

As will be appreciated, the enclosure 10, constructed in the preceding manner, can be easily, quickly, and accurately secured in system 82. More particularly, the enclosure 10 is first introduced into recess 122 and moved toward the rear wall 128 until connectors 19 and 124 meet. Because connector is free to undergo slight movements in the plane of the rear wall 128, the connectors 19 and 124 can be quickly aligned. At the same time, the alignment post 136 on the lower wall 134 of the recess 122 is introduced in the center opening 140 on the base of enclosure 10. As a result, the other two holes 140 are "automatically" aligned with the threaded inserts 138, in the lower wall 134 of the recess. The screws 142 are then guided by holes 140 to inserts 138, allowing the enclosure 10 to be quickly and securely mounted in recess 122.

The final aspect of the enclosure 10 to be noted is its inclusion of several features designed to improve its performance in harsh environmental conditions. In that regard, the enclosure 10 includes scuppers 144, or openings, between the cavity 84 and bottom 20 of base 11. The scuppers 144 allow water to drain from enclosure 10 through channels in recess 122 in the event that the enclosure 10 is exposed to, for example, rain during field use. Similarly, a cover plate 146 is positioned over the gears 67 and 70 located in the recessed portion 25 of the base sidewall 23 to protect the gears 67 and 70 and motor 18 from environmental hazards such as dust and dirt.

The present invention has been described in relation to a preferred embodiment. One of ordinary skill, after reading the foregoing specification, will be able to effect various changes, alterations, and substitutions or equivalents without departing from the broad concepts disclosed. It is therefore intended that the scope of the patent granted hereon be limited only by the definitions contained in the appended claims and the equivalents thereof.

The embodiments of the invention in which an exclusive property or privilege is claimed are defined as follows:

1. An enclosure for receiving a device for recording information on a printing medium, the enclosure comprising:
- a base forming a cavity for receiving the recording device and printing medium;
- a first cover connectable to the base, the first cover being movable between a closed position and an open position; and,
- a second cover connectable to the base, the second cover being movable between a closed position and an open position, the first and second covers substantially covering the cavity when in their closed positions and allowing the printing medium to be introduced into the cavity when in their open positions.

2. The enclosure of claim 1, wherein:
- the first cover is pivotably secured to the base; and,
- the second cover is pivotably secured to the base and moves opposedly to the first cover as the covers are pivoted from their closed to their open positions.

3. The enclosure of claim 2, further comprising a cover link with a first end pivotably secured to the base and a second end pivotably secured to the first cover.

4. The enclosure of claim 2, further comprising means for maintaining the first cover in its closed position.

5. The enclosure of claim 4, further comprising means for selectively locking the second cover in its closed position.

6. The enclosure of claim 5, wherein the means for selectively locking the second cover comprises at least one locking tab extending from the first cover; and at least one cover-locking notch provided on the second cover, the cover-locking notch being capable of receiving the locking tab of the first cover to secure the second cover in its closed positions.

7. The enclosure of claim 6, wherein the means for selectively locking the second cover further comprises at least one base-locking notch, the base-locking notch also being capable of receiving the locking tab of the first cover to further secure the first and second covers in their closed positions.

8. The enclosure of claim 5, further comprising:
- means for biasing the first cover to its open position; and,
- means for biasing the second cover to its open position.

9. The enclosure of claim 7, further comprising means for releasing the means for selectively locking the covers, allowing the first cover and the second cover to be moved to their open positions by the means for biasing the first cover and means for biasing the second cover.

10. The enclosure of claim 9, wherein the means for releasing the means for selectively locking the covers comprises a release flange secured to the first cover, the release flange releasing the means for selectively locking the covers when moved upwardly.

11. The enclosure of claim 9, further comprising means for ejecting the printing medium concurrently with the moving of the first cover and the second cover to their open positions.

12. An enclosure for receiving a device for recording information on a printing medium, the enclosure comprising:
- a base forming a cavity for receiving the recording device and printing medium;

a cover coupled to the base and movable between a closed position, a center position, and an open position; and over-center means for biasing the cover to its closed position when the cover is between the closed and center positions and to its open position when the cover is between the center and open positions.

13. A device for recording information on a printing medium, the recording device comprising:

a printhead for recording information on the printing medium;

a roller for advancing the printing medium past the printhead;

a motor capable of driving the roller;

a base forming a cavity for enclosing the printhead, the roller, the motor, and the printing medium;

a first cover pivotably secured to the base, the first cover being pivotable between a closed position and an open position; and, a second cover pivotably secured to the base, the second cover being pivotable between a closed position and an open position, the second cover pivoting opposedly to the first cover as the covers are pivoted from their closed positions, in which position the covers substantially cover the cavity of the base, to their open positions, in which position the printing medium may be introduced into the cavity.

14. The recording device of claim 13, wherein the roller is rotatably secured to the second cover.

15. The recording device of claim 14, further comprising means for continuously engaging the roller with the motor as the second cover is moved between the closed position and the open position.

16. The recording device of claim 15, wherein the means for continuously engaging the roller with the motor comprises:

a roller gear affixed to the roller;

a motor gear rotatably secured to the motor; and, at least one intermediate gear with, and coupling the roller gear to, the motor gear.

17. The recording device of claim 14, further comprising means for coupling the printhead to the first cover.

18. The recording device of claim 17, wherein the means for coupling the printhead to the first cover comprises a printhead link, the printhead link having a first end pivotably secured to the first cover and a second end pivotably secured to the printhead.

19. The recording device of claim 18, further comprising means for biasing the printhead against the roller when the first cover and second cover are in their closed positions.

20. The recording device of claim 19, further comprising:

a cover link with a first end pivotably secured to the base and a second end pivotably secured to the first cover;

means for biasing the first cover to its open position; and, means for biasing the second cover to its open position.

* * * * *